(12) United States Patent
Harrison

(10) Patent No.: US 6,597,384 B1
(45) Date of Patent: Jul. 22, 2003

(54) AUTOMATIC REORIENTING OF SCREEN ORIENTATION USING TOUCH SENSITIVE SYSTEM

(75) Inventor: Edward R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,726

(22) Filed: Dec. 22, 1999

(51) Int. Cl.[7] ................................................ G09G 5/00
(52) U.S. Cl. ........................ 345/905; 345/169; 345/173
(58) Field of Search ................................ 345/173, 169, 345/126, 864, 905, 123; 361/681, 683; 235/472

(56) References Cited

U.S. PATENT DOCUMENTS

| | | | | | |
|---|---|---|---|---|---|
| 5,656,804 A | * | 8/1997 | Barkan et al. | .............. | 235/472 |
| 5,661,632 A | * | 8/1997 | Register | ..................... | 345/905 |
| 5,798,750 A | * | 8/1998 | Ozaki | ......................... | 345/173 |
| 5,907,375 A | * | 5/1999 | Nishikawa et al. | ......... | 345/173 |
| 5,949,408 A | * | 9/1999 | Kang et al. | ................. | 345/169 |
| 5,996,080 A | * | 11/1999 | Silva et al. | ................. | 345/173 |
| 6,049,813 A | * | 4/2000 | Danielson et al. | .......... | 361/683 |
| 6,115,025 A | * | 9/2000 | Buxton et al. | ............... | 345/126 |
| 6,137,468 A | * | 10/2000 | Martinez et al. | ............ | 345/126 |
| 6,266,236 B1 | * | 7/2001 | Ku et al. | ..................... | 361/681 |
| 6,297,795 B1 | * | 10/2001 | Kato et al. | ................... | 345/123 |
| 6,331,867 B1 | * | 12/2001 | Eberhard et al. | ........... | 345/864 |

\* cited by examiner

*Primary Examiner*—Bipin Shalwala
*Assistant Examiner*—David L Lewis
(74) *Attorney, Agent, or Firm*—Fish & Richardson P.C.

(57) ABSTRACT

An automatically-reconfigurable screened device. The direction of display is automatically sensed, and is automatically changed. The display is sensed by detecting which of a plurality of sensors is being touched.

9 Claims, 1 Drawing Sheet

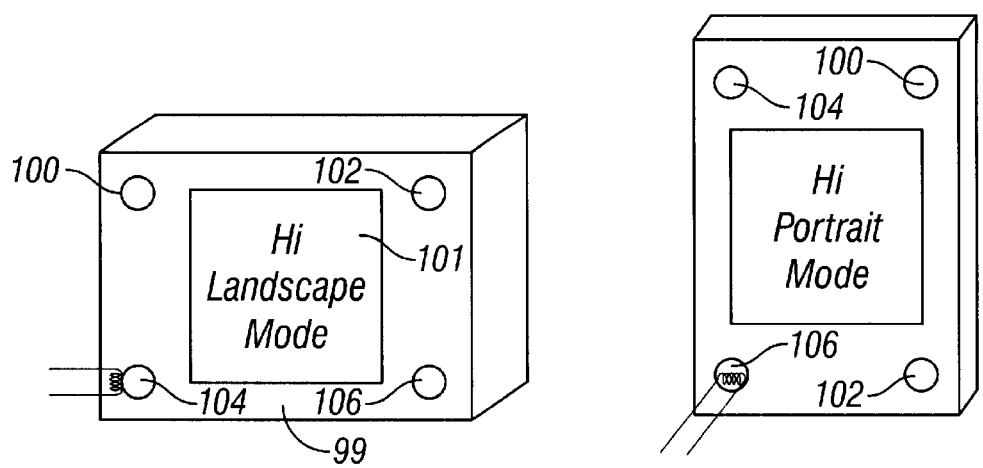
FIG. 1A  FIG. 1B
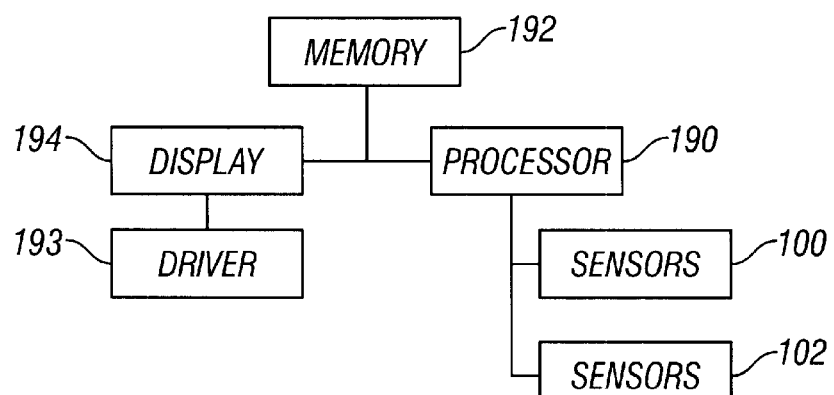
FIG. 2
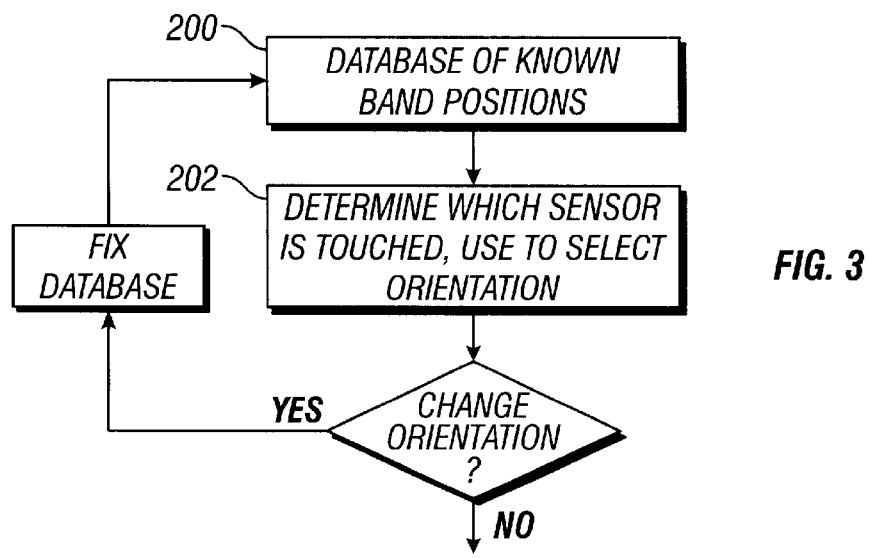
FIG. 3

AUTOMATIC REORIENTING OF SCREEN ORIENTATION USING TOUCH SENSITIVE SYSTEM

The present application describes an automatically-reoriented screen.

BACKGROUND OF THE INVENTION

Computer screens conventionally have a rectangular aspect ratio. Screens in the United States, for example, are typically oriented with the wider portion of the screen oriented horizontally ("landscape mode"). Word processing-based computers often orient the screen with the wider portion being vertical, ("portrait mode") to match the orientation of a conventional printer.

This raises the possibility of displaying the information differently depending on the orientation of the computer screen. Display drivers are known which enable displaying information in either the portrait mode or landscape mode. A computer screen could be changed between orthogonal directions to display either the portrait mode or the landscape mode. It may be possible to manually orient the screen orientation between the modes. However, this could be a time consuming process.

This could be usable in a system that uses a hand-held terminal to access the Internet or in an LCD monitor.

SUMMARY OF THE INVENTION

The present application describes a reconfigurable oriented view screen device, that has a sensor which senses a position of touching, and a display reconfiguration element, which automatically changes a direction of display on the screen based on the position of touching.

DETAILED DESCRIPTION OF THE DRAWINGS

These and other aspects will now be described with reference to the drawings, including:

FIGS. 1A and 1B show an embodiment of the touch screen, oriented in orthogonal directions;

FIG. 2 shows a block diagram of the hardware of the system; and

FIG. 3 shows a flowchart of operation.

DETAILED DESCRIPTION

The present application teaches using a touch sensitive device which automatically senses screen orientation from the way that the screen is being touched. The sensed screen orientation is used to adjust the display driver to change the mode of display.

FIGS. 1A and 1B show an embodiment. A housing 99 forms a shroud for a screen 101, preferably a screen with a rectangular aspect ratio. The screen periphery also includes a number of touch sensors 100, 102, 104 and 106. The sensors can be any kind of sensor, including a mechanical sensor, or conductive paint, for example. Each of the sensor detects touching by a person's hand. The position where the user is touching the screen is used to determine the screen orientation. The image on the screen is automatically rotated so as to appear right side up to the user based on that determined orientation.

FIG. 1A shows the user holding the display in the area of sensor 104. This is an indication that the screen is being held in the orientation shown in FIG. 1A, in the so-called landscape mode. The image on the screen, e.g. the text, is reoriented to display in the appropriate direction as shown.

FIG. 1B shows the user holding the device in the area sensor 106. This indicates that the area of holding the sensor is intended to be the bottom portion of the screen. This area of holding hence detects that the screen is being oriented in portrait mode, as shown. The image on the screen is then reoriented and displayed in the new orientation.

The device shown in FIGS. 1A and 1B can be hand held devices for Internet access, such as a palm top computer or a cellular telephone, or an audio visual system remote control with a display.

A block diagram of the system is shown in FIG. 2, and a flowchart of its operation is shown in FIG. 3. The device includes any basic computing mechanism: a processor 190, with associated memory 192. A display configuration function can be carried out by the processor directly driving the display, or alternatively by a dedicated display driver. Display driver 193 can be selectively operated in either portrait or landscape mode under software control. The sensors 100, 102, 104 and 106 are also shown. The sensors are shown directly connected to the processor, although it should be understood that they can alternately be connected via an interface, such as a multiplexer or an analog to digital, A to D converter.

The processor runs a routine stored in memory 192.

A database of known hand positions is first obtained at step 200. This can be obtained in a number of different ways. One way is to use a statistical sampling of different hand orientations obtained through experimentation. Another way is to continuously monitor information from the actual screen being monitored, and form a database including information on the user's individual way of holding the screen and the selected mode when the display is held in that way.

At step 202, the system detects which sensor is being touched by the user. This is used along with the database 200 to determine the orientation from the actual hand positions and from the information in the database. Step 210 represents a manual request by the user to change the screen orientation. This typically indicates that the detected screen orientation was incorrect. Hence, this information can be added to the database of known hand positions and used as corrective information. For example, this indicates that when the user is holding the screen as per the current configuration, that the correct orientation should be as per the changed orientation. This information is stored in the memory 192.

Another embodiment uses the position of screen touching to determine handedness. For example, by determining whether a user is touching left or right, the handedness of a person is detected, and the screen is rearranged appropriately.

Although only a few embodiments have been disclosed in detail above, other modifications are possible.

All such modifications are intended to be encompassed in the following claims, in which:

What is claimed is:

1. A reconfigurable oriented view screen device, comprising:
   a housing, having a plurality of sensors at different locations on the housing each a sensor which senses a position of touching;
   a detector, which detects said position of touching, by finding which of said plurality of sensors is being touched at any one time; and
   a display configuration element, which forms information for display on a screen that is oriented in a display mode that is based on said position of touching.

2. A device as in claim 1 further comprising a memory, storing a database of information which correlates said position of touching to a screen orientation.

3. A device as in claim 2 wherein said display configuration element uses said position of touching to access said database and determine an orientation of a screen therefrom and change said direction of display based on said orientation.

4. A device as in claim 3 further comprising a user interface which enables a manual change of said orientation.

5. A device as in claim 1 further comprising a screen with a rectangular ratio.

6. A device as in claim 5 wherein said screen has four corners, and wherein there are four sensors, one located near each of said corners.

7. A reconfigurable screen device, comprising:

a housing, having at least first and second positions;

a display, attached to said housing;

a first sensor, located at said first position;

a second sensor located at said second position;

a processor, executing a stored program to determine if said first sensor is being touched by a user and to orient said display of the display information in first direction if so, and to determine if the second sensor is being touched by a user and orienting the display in a second direction, different than said first direction, if so.

8. A device as in claim 7, wherein said sensors are formed by conductive paint.

9. A device as in claim 7, wherein said sensors are mechanical sensors.

* * * * *